J. W. NEWLIN & J. S. SIMMERMAN.
Station-Indicators.
No. 145,583.  Patented Dec. 16, 1873.
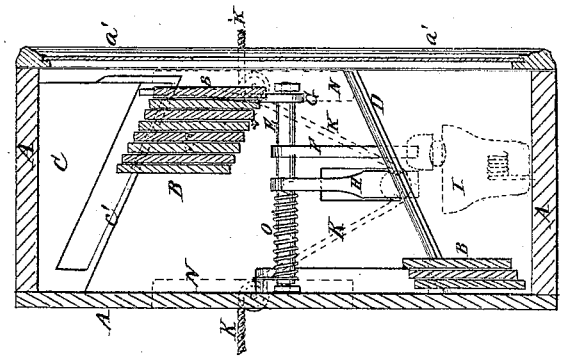
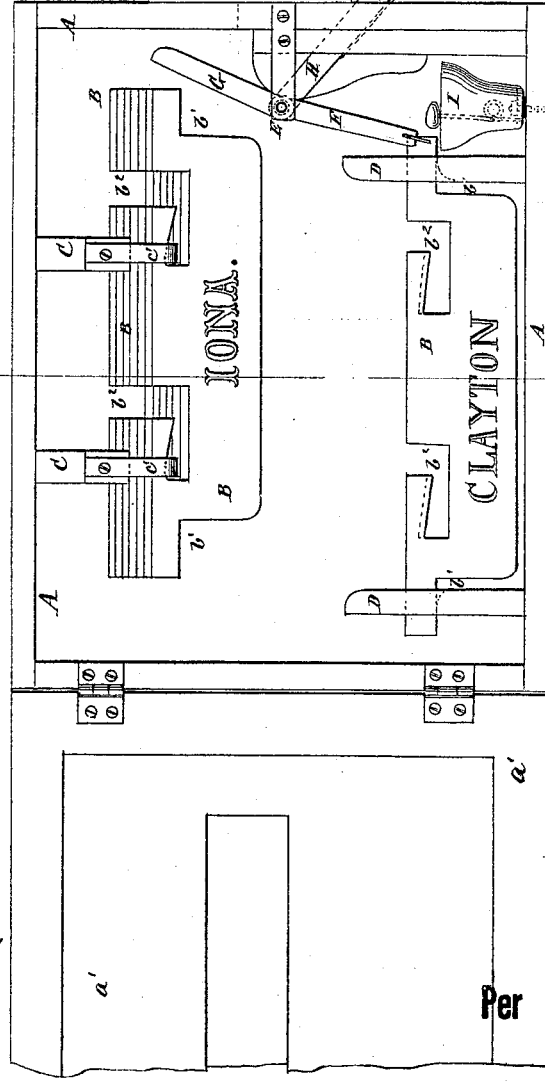
Witnesses:
A. W. Almquist
Sedgwick
Inventor:
J. S. Simmerman
J. W. Newlin
Per
Attorneys.

UNITED STATES PATENT OFFICE.

JOHN W. NEWLIN AND JACOB S. SIMMERMAN, OF MILLVILLE, NEW JERSEY.

IMPROVEMENT IN STATION-INDICATORS.

Specification forming part of Letters Patent No. 145,583, dated December 16, 1873; application filed October 4, 1873.

*To all whom it may concern:*

Be it known that we, JOHN W. NEWLIN and JACOB S. SIMMERMAN, of Millville, in the county of Cumberland and State of New Jersey, have invented a new and useful Improvement in Station-Indicator, of which the following is a specification:

Figure 1 is a front view of our improved indicator, the door being opened. Fig. 2 is a cross-section of the same taken through the line $x\,x$, Fig. 1.

Similar letters of reference indicate corresponding parts.

Our invention has for its object to furnish an improved station-indicator for railroad-cars, which shall be so constructed that the indicators throughout the train may all be adjusted at the same time, and which shall be simple in construction, convenient in use, reliable in operation, and not liable to get out of order. The invention consists in the rabbeted and slotted strips, the upper inclined strips, and the lower inclined strips, constructed and arranged in connection with the box; and in the combination of the shaft and its arms and spring with the rabbeted and slotted strips and the box.

A is a rectangular box, which is designed to be secured in some suitable position in a car. The front $a^1$ of the box A is hinged at one end, to serve as a door, is secured at the other end with some convenient fastening, and has a transparent portion in its middle part, to allow the names of the stations to be seen. The names of the stations are printed upon strips B of wood or other suitable material, one name being printed upon each strip. The ends of the lower edge of the strips B have rabbets $b^1$ formed in them, as shown in Fig. 1. The upper parts of the strips B have slots $b^2$ formed in them, which enter vertically from the upper edge of the said strips, and then turn at right angles and project horizontally. The upper edge of the horizontal part of the slots $b^2$ is made inclined, as shown in Fig. 1. C are strips, made with inclined lower edges, and of less width than the slots $b^2$, so as to pass into them. The strips C are attached to the top of the box A, and to their lower inclined edges are attached metallic straps $c'$, in such a way as to form inclined slots between them and the inclined lower edges of the said strips C. D are strips with inclined upper edges, the lower edges of which are attached to the bottom of the box A. The forward ends of the strips D extend close up to the door $a'$. The lower edges of the strips C incline downward toward the door $a'$, and the upper edges of the strips D incline downward toward the back of the box A, as shown in Fig. 2. E is a shaft, which works in bearings attached to the box A, and to which are rigidly attached three arms, F G H. The arm F projects downward into such a position as to strike the clapper of a bell, I, attached to the box A. The arm G projects upward into such a position that, when moved forward, it may strike against the end of the lowest strip, B, and push it longitudinally until it drops upon the lower strips D, down which it slides to the rear part of the box A. The third arm, H, passes out through a slot in the end of the box A, and has a pulley, J, pivoted to its end, to receive a cord, K, which is kept in place upon the pulley J by a spring, L, which allows the cord K to be slipped off and on conveniently. The cord K passes over pulleys M, pivoted in brackets N, attached to the box A, upon the opposite sides of and above the end of the arm H. The cord K extends through all the cars of the train, being connected by snap-hooks at the ends of the cars, and its ends are secured, so that it may be pulled in either direction and from any part of the train.

By this construction, when the cord is pulled the first effect is to take up the slack, and the next effect is to raise all the arms H, which operates the arms F to strike the bells I, and the arms G to push the lowest strip from its place and expose the next strip.

The shaft E has a spring, O, coiled around and connected with it, so as to bring it and the arms F G H back to their places whenever the cord K is released. The shaft E and its arms F G H may be placed in the upper or lower part of the box A, as may be desired.

By this construction, when the end of the route is reached the strips B will all be upon the lower strips, D, and arranged in proper order for the return trip, so that all that will be necessary to rearrange the indicators will be to raise the strips B, and hang them upon the straps $c'$ of the strips C.

The indicator is also intended for use as a street-indicator for street-cars and other conveyances.

Having thus described our invention, we claim as new and desire to secure by Letters Patent—

1. The combination of the strips B, having slots $b^2$ and notches $b^1$, with the upper strips, C $c'$, and the lower inclined strips, D, all as shown and described, to operate as specified.

2. The combination of the shaft E, arms G H, and spring O with the strips B $b^1$ $b^2$ and box A $a'$, substantially as herein shown and described.

JOHN W. NEWLIN.
JACOB S. SIMMERMANN.

Witnesses:
MATTHIAS S. HUGHES,
CHARLES D. WELLS.